Figure 1:
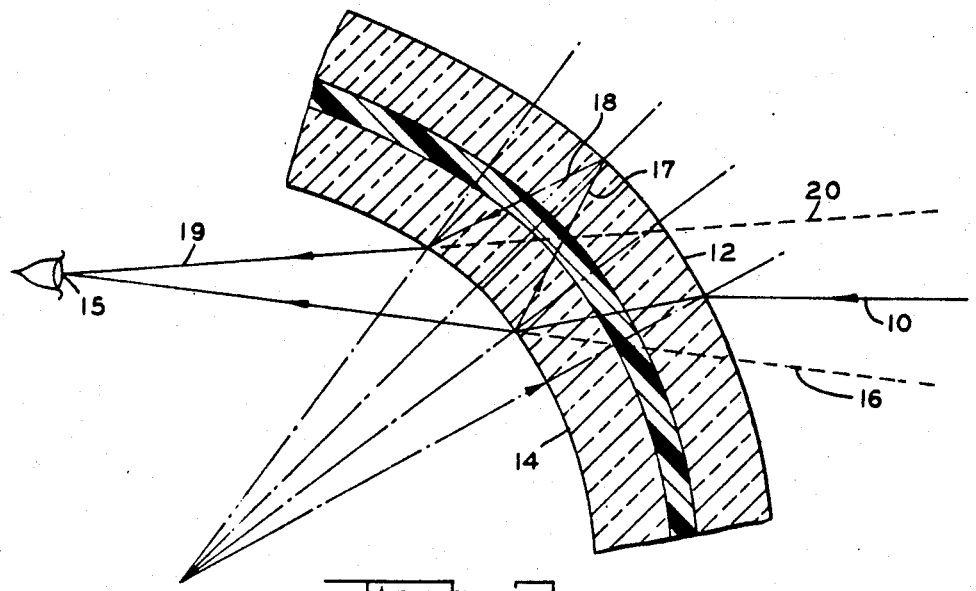
Figure 2:
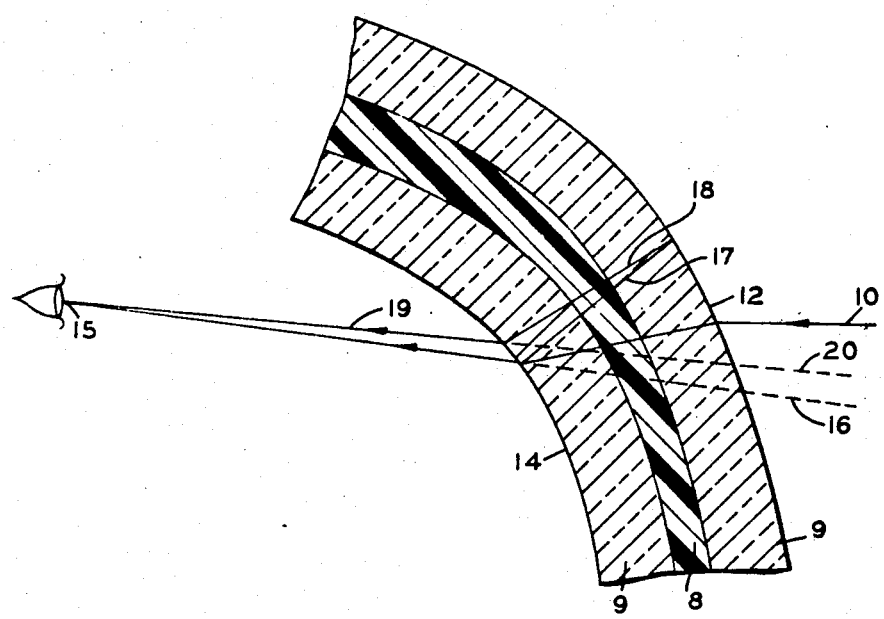
Figure 3:
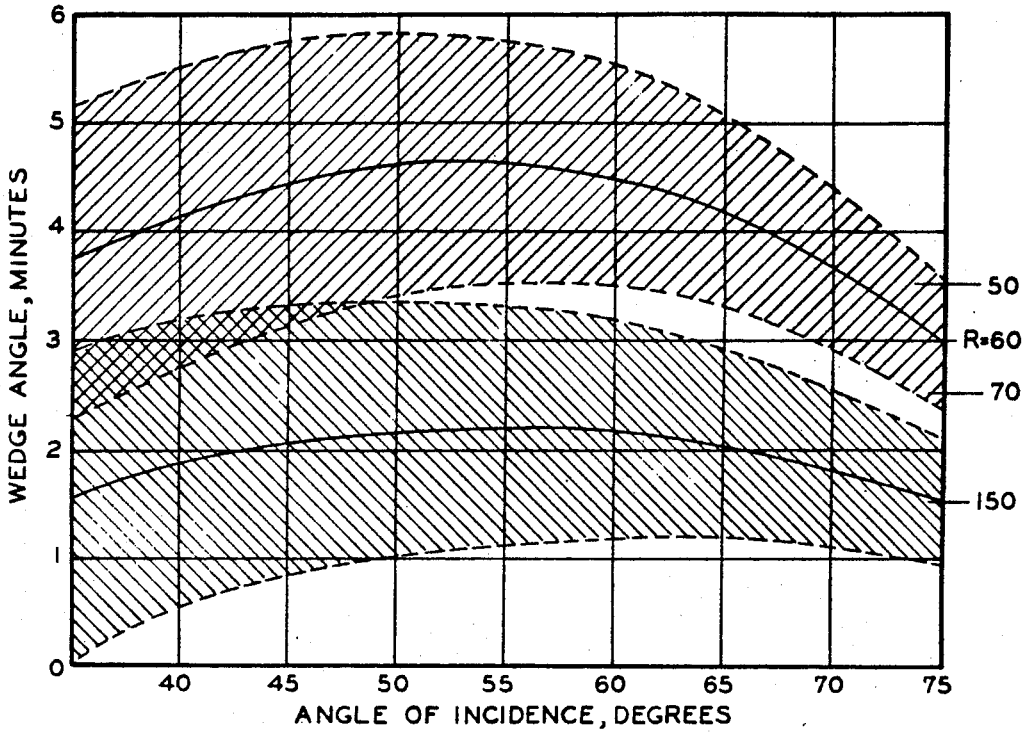

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1019

739,939

LAMINATED GLASS ASSEMBLY WITH TAPERED INNER LAYER

Howard V. Christensen, Dearborn, Mich., assignor to Ford Motor Company, Dearborn, Mich., a corporation of Delaware

Continuation of application Ser. No. 485,199, Sept. 7, 1965. This application June 6, 1968. Published Apr. 22, 1969

Class 350—319

2 Sheets Drawing. 8 Pages Specification

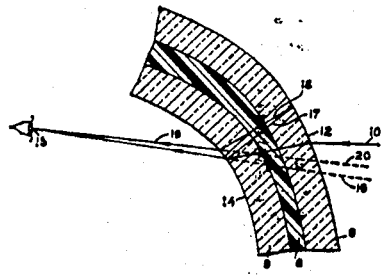

In order to correct double vision characteristics of curved windshields constructed of two sheets of glass, each sheet having a uniform thickness, a tapered or wedged vinyl inner layer is positioned therebetween during a laminating operation. The vinyl inner layer is thicker at the top of the windshield than at the bottom. In a preferred windshield construction, the inner layer had a thickness of .035 inch at the top and .015 inch at the bottom of the windshield which was 26 inches wide. The amount of wedge to be placed in the layer of vinyl depends both on the angle of installation of the windshield and the radius of curvature of the windshield. These factors are correlated graphically for windshields having different radius of curvature. The graphical illustration shows that for a 60-inch curvature a wedge angle of three to five minutes is sufficient to eliminate the double vision characteristics whereas a wedge angle of one to three minutes is sufficient to eliminate double vision characteristics for a 150-inch radius of curvature windshield.

350-319

[redacted]

257

April 22, 1969 H. V. CHRISTENSEN DEF. PUB. T861,031

LAMINATED GLASS ASSEMBLY WITH TAPERED INNER LAYER ~~SN 739939~~

Original Filed Sept. 7, 1965 Sheet 1 of 2

INVENTOR.
HOWARD V. CHRISTENSEN
BY

P. F. Hilder
ATTORNEY

INVENTOR.
HOWARD V. CHRISTENSEN
BY
P. F. Hilder
ATTORNEY